US012715642B2

(12) United States Patent
Nijs et al.

(10) Patent No.: US 12,715,642 B2
(45) Date of Patent: Aug. 25, 2026

(54) METHOD AND DEVICE FOR DETECTING DEFECTS DURING SEALING OF A PACKAGE COMPRISING A FILM

(71) Applicant: ENGILICO ENGINEERING SOLUTIONS NV, Rotselaar (BE)

(72) Inventors: Peter Nijs, Rotselaar (BE); Olivier Georis, Rotselaar (BE); Alex De Bruyn, Rotselaar (BE); Denis Vanderstraeten, Rotselaar (BE)

(73) Assignee: ENGILICO ENGINEERING SOLUTIONS NV, Rotselaar (BE)

( * ) Notice: Subject to any disclaimer, the term of this patent is extended or adjusted under 35 U.S.C. 154(b) by 0 days.

(21) Appl. No.: 18/845,378

(22) PCT Filed: Mar. 14, 2023

(86) PCT No.: PCT/IB2023/052462
§ 371 (c)(1),
(2) Date: Sep. 9, 2024

(87) PCT Pub. No.: WO2023/175497
PCT Pub. Date: Sep. 21, 2023

(65) Prior Publication Data

US 2025/0187773 A1 Jun. 12, 2025

(30) Foreign Application Priority Data

Mar. 15, 2022 (BE) .................................. 2022/5179

(51) Int. Cl.
*B65B 57/02* (2006.01)
*B29C 65/00* (2006.01)
*B65B 51/14* (2006.01)

(52) U.S. Cl.
CPC .......... *B65B 57/02* (2013.01); *B29C 66/1122* (2013.01); *B29C 66/8161* (2013.01);
(Continued)

(58) Field of Classification Search
CPC . B65B 57/02; B65B 51/146; B29L 2031/712; B29C 65/02; B29C 66/1122;
(Continued)

(56) References Cited

U.S. PATENT DOCUMENTS 5,551,206 A * 9/1996 Fukuda ............. B29C 66/81431 53/551
5,836,136 A * 11/1998 Highberger ......... B29C 66/8224 53/551
(Continued)

FOREIGN PATENT DOCUMENTS

CN 104309837 A * 1/2015 ............... B65B 9/12
CN 105539948 A * 5/2016 ......... B29C 66/9292
(Continued)

OTHER PUBLICATIONS

WIPO, International Search Report issued for PCT/IB2023/052462, Jun. 15, 2023.

*Primary Examiner* — Robert F Long
*Assistant Examiner* — Eduardo R Ferrero
(74) *Attorney, Agent, or Firm* — Hodgson Russ LLP

(57) ABSTRACT

The present invention relates to a method for detecting defects in the sealing of a package, comprising positioning a film and another part of the package between two sealing bars and successively closing and opening the sealing bars, 'wherein at least during the closing of the sealing bars distances are measured with the aid of distance sensors between both sealing bars or between a sealing bar and a sealing bar holder, wherein a unitless measure of deviation at a point in time T is calculated and compared with a threshold value, wherein the unitless measure of deviation is calculated from a relative measure for a distance between both sealing bars or between a sealing bar and a sealing bar holder. The invention also relates to a device and a use.

16 Claims, 3 Drawing Sheets

(52) U.S. Cl.
CPC ........ *B29C 66/849* (2013.01); *B29C 66/9231* (2013.01); *B29C 66/9261* (2013.01); *B65B 51/146* (2013.01)

(58) Field of Classification Search
CPC ............ B29C 66/8161; B29C 66/8322; B29C 66/83221; B29C 66/849; B29C 66/9231; B29C 66/92311; B29C 66/9261; B29C 66/92611; B29C 66/92615; B29C 66/43
See application file for complete search history.

(56) References Cited

U.S. PATENT DOCUMENTS

| | | | | |
|---|---|---|---|---|
| 6,167,677 | B1 * | 1/2001 | Kammler | B29C 66/872<br>53/551 |
| 6,711,874 | B1 * | 3/2004 | Nakagawa | B65B 1/46<br>53/64 |
| 6,732,496 | B1 * | 5/2004 | Wessman | B29C 66/965<br>53/64 |
| 9,976,842 | B2 * | 5/2018 | Bravo | B29C 66/961 |
| 10,865,005 | B2 * | 12/2020 | Miller | B65D 33/002 |
| 11,370,573 | B2 * | 6/2022 | Gartmann | B29C 66/4312 |
| 2002/0092994 | A1 * | 7/2002 | Kitamura | B29C 66/5344<br>250/559.29 |
| 2005/0104599 | A1 * | 5/2005 | Otsuka | B29C 66/72321<br>324/519 |
| 2007/0084285 | A1 * | 4/2007 | De Baerdemaeker | B29C 66/1122<br>73/52 |
| 2007/0163349 | A1 * | 7/2007 | Johansen | B29C 66/924<br>73/584 |
| 2010/0108249 | A1 * | 5/2010 | Hunnicutt | B32B 37/0046<br>156/60 |
| 2014/0352253 | A1 * | 12/2014 | Yamamoto | B29C 66/8224<br>53/76 |
| 2014/0357462 | A1 * | 12/2014 | Voss | B65B 9/13<br>53/64 |
| 2014/0367020 | A1 * | 12/2014 | Klinstein | B29C 66/932<br>156/64 |
| 2015/0028860 | A1 * | 1/2015 | Bravo | B29C 65/18<br>356/614 |
| 2018/0257802 | A1 * | 9/2018 | Resch | B65B 57/02 |
| 2018/0347754 | A1 * | 12/2018 | Miller | B65D 33/002 |
| 2019/0240922 | A1 * | 8/2019 | Jansson | B29C 66/83221 |

FOREIGN PATENT DOCUMENTS

| | | | | | |
|---|---|---|---|---|---|
| DE | 102011075424 | A1 | | 11/2012 | |
| EP | 0950608 | A1 | | 10/1999 | |
| EP | 2804742 | A1 | | 11/2014 | |
| EP | 3168032 | A1 | * | 5/2017 | B65B 57/18 |
| JP | 2005104512 | A | * | 4/2005 | B29C 66/9592 |
| JP | 2006193176 | A | * | 7/2006 | B29C 66/8491 |
| JP | 2007039047 | A | * | 2/2007 | B29C 66/81431 |
| JP | 2007062817 | A | * | 3/2007 | B29C 66/4312 |
| JP | 2007191197 | A | | 8/2007 | |
| JP | 2009236537 | A | * | 10/2009 | B29C 65/82 |

* cited by examiner 3
3
B
C
2
4
4
5
5
6
E
D
A
1
5
5
4
2
4
3
3

E
C
3
3
3
2
D
6
A
1
D
4
4
2
4
4

METHOD AND DEVICE FOR DETECTING DEFECTS DURING SEALING OF A PACKAGE COMPRISING A FILM

TECHNICAL FIELD

The invention relates to a method for detecting defects during sealing of a package comprising film, more particularly when sealing with the aid of two sealing bars.

PRIOR ART

A wide range of products are packaged in an airtight sealed package to extend the shelf life of the products, to guarantee quality and/or to maintain sterility. Such products range from food and beverages to a variety of medical, electrical and pharmaceutical products. A crucial point in the packaging process is to ensure a high-quality sealing of the packaging. One of the factors that determines the quality of the seal is airtightness. This is certainly a very important aspect in the case of food and beverages, where the quality of a packaged product can degrade very quickly if the sealing quality is insufficient. Another possible factor influencing the quality of the seal is the presence of, for example, inclusions in the seal. As a result, the seal is less strong, and this can also have a direct effect on the airtightness of the seal. A seal of insufficient quality is a common problem in the packaging industry when sealing a package using a film. Therefore, in the packaging industry, devices and methods are used to automatically detect defects during sealing of a package with a film.

Such a device is known, inter alia, from EP 2 804 742 (EP '742). EP '742 describes a device and a method for detecting defects during the sealing of a package with a film. The device comprises at least one distance sensor for measuring a distance between two sealing bars during sealing of the package with a film. The measured distances are measured during sealing and compared with predetermined reference values. If at least one measured distance exceeds at least one predetermined reference value, a signal is generated. This signal is an indication that the seal is of insufficient quality.

This known device and method has the disadvantage that the device and the method are only suitable for use with a packaging machine that allows the distance between the two sealing bars to be measured. A device for automatically detecting defects is often placed on a packaging machine afterwards. Depending on the construction of the packaging machine, it is not always possible to place distance sensors on the packaging machine in such a way that the distance between the sealing bars can be effectively measured, as a result of which the use of the device and the method from EP '742 is not feasible. In addition, the method described in EP '742 does not take into account, for example, possible transition effects when starting up the packaging machine or variations in, for example, thickness of the film, temperature of the packaging machine or the temperature of the sealing bars.

The present invention aims to solve at least some of the above problems or drawbacks.

SUMMARY OF THE INVENTION

In a first aspect, the present invention relates to a method.

This method is very advantageous because it is possible to detect defects during sealing of a package comprising film, both in the case that the distance between the two sealing bars can be measured, and in the case where a packaging machine has such a structure, it is not possible to measure the distance between the sealing bars directly or indirectly by means of the distance sensors. The detection of defects during sealing is based on relative displacements of the sealing bars relative to each other or, in case it is not possible to directly or indirectly measure the distance between the sealing bars, on relative displacements of a sealing bar relative to a sealing bar holder. Because the method works with relative displacements, it is not necessary to know an absolute distance between the sealing bars.

Preferred forms of the method are disclosed herein.

A specific preferred form concerns a method.

This preferred form is advantageous because two relative displacements are taken into account, namely a displacement along the trajectory A and a rotation about the axis E. As a result, possible inaccuracies in the event that the distance between the sealing bars cannot be measured is largely to completely compensated. An additional advantage is that defects can also be detected, in which, for example, in the middle of a sealing bar, according to the longitudinal direction of the sealing bar, a similar displacement along the trajectory A is obtained as with a correct sealing of a package comprising film, while more towards an end of the sealing bar an inclusion is present, whereby in reality no quality seal has been obtained.

A specific preferred form concerns another method.

This preferred form has the advantage that when calculating the terms of the unitless measure of deviation, a dynamic behavior during the sealing of the package comprising film is taken into account, for instance due to heating of the packaging machine, due to an increase or decrease in a thickness of the film, due to an increase or decrease of tension on or in the film, due to temperature variations of the packaging machine or the sealing bars, etc. As a result, defects can be detected with greater sensitivity, because less or no account has to be taken of the dynamic behavior at the predetermined threshold value.

In a second aspect, the present invention relates to a device.

This embodiment is advantageous because the device comprises the necessary distance sensors for carrying out the method and because this results in an integrated device for detecting defects during sealing of packages comprising film, even if it is not possible to determine an absolute distance between the sealing bars.

Preferred forms of the device are described herein.

In a third aspect, the present invention relates to a use.

This use results in an improved packaging of food products, because possible defects during the sealing of the food packaging are automatically detected, even when using a packaging machine with a construction that does not allow to measure distances between sealing bars of the packaging machine. This prevents food products from entering the food chain that, for example, are not packaged airtight and can therefore spoil quickly, with a possible risk of food poisoning, for example.

DETAILED DESCRIPTION

Figure 1:
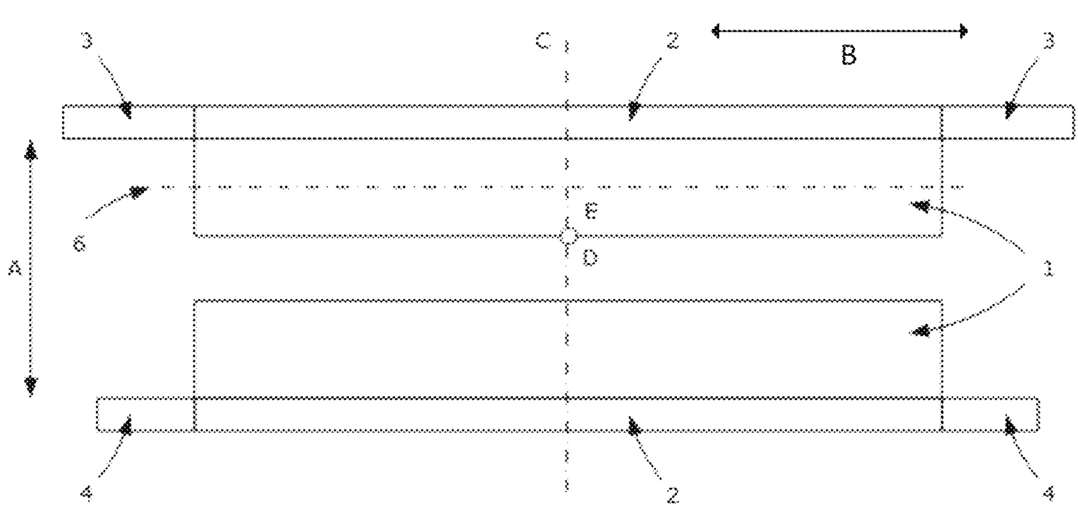
FIG. 1 shows a schematic representation of an arrangement of distance sensors on sealing bar holders of a device according to an embodiment of the present invention.

Unless otherwise defined, all terms used in the description of the invention, including technical and scientific terms, have the meaning as commonly understood by a person skilled in the art to which the invention pertains. For a better understanding of the description of the invention, the following terms are explained explicitly.

In this document, “a”, “an” and “the” refer to both the singular and the plural, unless the context presupposes otherwise. For example, “a segment” means one or more than one segment.

The terms “comprise”, “comprising”, “consist of”, “consisting of”, “provided with”, “include”, “including”, “contain”, “containing”, are synonyms and are inclusive or open terms that indicate the presence of what follows, and which do not exclude or prevent the presence of other components, characteristics, elements, members, steps, as known from or disclosed in the prior art.

Quoting numerical intervals by endpoints comprises all integers, fractions and/or real numbers between the endpoints, these endpoints included.

Furthermore, the terms “first”, “second”, “third” and the like are used in the description and in the claims to distinguish between like elements and not necessarily to describe a sequential or chronological order unless specified. It is to be understood that the terms so used are interchangeable under appropriate circumstances and that the embodiments of the invention described herein may operate in sequences other than those described or illustrated herein.

In the context of this document, two distance sensors lying symmetrically with respect to an axis in a plane means that a perpendicular distance from a first distance sensor to a projection of said axis on said plane differs at most by 10% from a perpendicular distance from a second distance sensor to said projection, preferably at most 5%, more preferably at most 2%, even more preferably at most 1% and even more preferably at most 0.5%.

In a first aspect, the invention relates to a method for detecting defects during sealing of a package comprising film.

According to a preferred embodiment, the method comprises the steps of:

- positioning the film and another part of the package comprising film between two parallel sealing bars;
- moving one or both sealing bars towards each other along a trajectory A, wherein a connection is formed between the film and the other part of the package comprising film;
- moving one or both sealing bars along a trajectory A, wherein the sealing bars are removed from each other;
- and removing the sealed package.

Non-limiting examples of packages comprising film are a tray sealed with a film, a preformed pouch with one open side and a pouch formed by sealing a tubular film at two ends. Tubular film is a seamless film with two open ends. The film is folded shut for packaging goods in the tubular film. Alternatively, the tubular film is formed from a flat film around a tube, wherein two edges of the film are sealed together in a longitudinal direction of the tube. The tubular film is sealed at a first end, after which the goods to be packaged are placed in the pouch and a second end is sealed. Only after packaging the goods in the tubular film is a tubular shape created. In the case of a preformed pouch with one open side, the pouch is first filled with the goods to be packed and then sealed on the open side. In the case of a tray, the other part of the package comprising film is a protruding edge of the tray onto which the film is adhered, for example. In the case of a pouch, the film and the other part of the package comprising film are two opposite faces of the folded shut tubular film. In the case of a preformed pouch with one open side, the film and the other part of the package comprising film are two opposite faces of the preformed pouch.

Non-exhaustive examples of defects are product or other packaging material in the sealing, creases in the sealing, sealings that are too narrow or too wide, no sealing, non-straight sealing, etc.

The two sealing bars extend in a longitudinal direction. The sealing bars therefore have a longitudinal direction, a height direction and a transverse direction. The longitudinal direction determines the largest dimension of a sealing bar. The two sealing bars are parallel along the longitudinal direction. Each sealing bar is mounted in its own sealing bar holder. The sealing bars are preferably releasably mounted in the sealing bar holders. This is advantageous for cleaning and replacing the sealing bars. A sealing bar is moved by moving its own sealing bar holder. A sealing bar comprises a longitudinal axis. The longitudinal axis is parallel to the longitudinal direction.

The said longitudinal direction of the sealing bars is transverse to a line described by the trajectory A during the movement of one sealing bar or both sealing bars along the trajectory A. The trajectory A is described by a straight line, an arc or another suitable curve. Preferably, the trajectory A is a straight line. By moving one sealing bar or both sealing bars towards each other along a trajectory A, the film and the other part of the package comprising film are clamped together. A connection is herein formed between the film and the other part of the package comprising film. For example, in the case of a tray, because a layer of glue has been applied to the edge of the tray and because the film is adhered to the edge of the tray by the clamping. Another possibility is that the film and the edge of the tray are clamped together between the two sealing bars and because the two sealing bars are heated, the film and the edge of the tray are welded together. For example, in the case of a tubular film or a preformed pouch with one open side, because two opposite faces of the folded shut tubular film or preformed pouch are clamped together at an end, respectively the open side, between the two sealing bars and because the two sealing bars are heated, causing the two opposing faces to be welded together. When sealing packages comprising film by heating the sealing bars, the sealing bars can be heated either by continuous or pulse heating. An alternative is that the sealing bars are ultrasonic sealing jaws. Depending on the design of a packaging machine, several packages comprising film can be sealed simultaneously between two sealing bars.

It will be apparent to one skilled in the art that if both sealing bars are moved, both sealing bars are moved in an opposite sense along the trajectory A. It will also be apparent to one skilled in the art that a sealing bar is moved in an opposite direction during the removal of the sealing bars from each other than during the moving of the two sealing bars towards each other. It will also be apparent to one skilled in the art that if only one sealing bar is moved, preferably always the same sealing bar is moved.

At least during the step of moving one or both sealing bars towards each other, distances between both sealing bars or distances between a sealing bar and a sealing bar holder are measured using several distance sensors. Non-limiting examples of suitable distance sensors are laser distance meters, ultrasonic transceivers, capacitive distance sensors and inductive distance sensors.

Preferably, distances between both sealing bars are measured using multiple distance sensors. If this is not possible, for example due to a mechanical construction of a packaging machine, distances between a sealing bar and a sealing bar holder are measured with the aid of several distance sensors. This means that distances between a sealing bar and its own sealing bar holder are measured with the aid of several distance sensors. The distances between a sealing bar and a sealing bar holder are measured for one or both sealing bars. Preferably, the distances between a sealing bar and a sealing bar holder are measured for both sealing bars. If distances are measured between a sealing bar and a sealing bar holder, the sealing bar and the sealing bar holder are attached to each other in a spring-loaded manner. This means that by moving the sealing bar holder along the trajectory A, the sealing bar attached to it is also moved along the trajectory A and that when both sealing bars touch each other or the package comprising film, by the pressing of one or more springs, a sealing bar moves along the trajectory A in the event of a further displacement of its own sealing bar holder relative to its own sealing bar holder.

Multiple distance sensors for measuring distances between the two sealing bars or between a sealing bar and its sealing bar holder are advantageous for determining a measure of a displacement along the trajectory A of points D of the two sealing bars relative to each other or of a point D of a sealing bar relative to its own sealing bar holder, where the point D is in the center of a sealing surface of a sealing bar.

The sealing surfaces of both sealing bars are surfaces which, during sealing of the package comprising film, are wholly or partly in contact with the film or the other part of the package comprising film and between which the film and the other part of the package comprising film are clamped. The package comprising film is normally sealed centrally between the sealing bars, which makes it advantageous to determine the measure for the displacement along the trajectory at point D. Due to the mechanical construction of a packaging machine, it is often practically impossible to place a distance sensor in or near point D. The measure of the displacement along the trajectory can be easily determined by, for example, calculating a weighted average of the distances measured by the distance sensors, where a weight for a distance in the weighted average depends on a distance from the distance sensor to the point D, as viewed along the longitudinal direction. Distance sensors equidistant longitudinally from point D are advantageous because it is not necessary to know an exact longitudinal distance between the distance sensors and point D.

The measure of the displacement along the trajectory A is advantageous for detecting defects during sealing of a package comprising film.

For example, in the case of inclusions of a product to be packaged, for example a food product, between the film and the other part of the package comprising film, two sealing bars can be moved towards one another less than usual along the trajectory A. With a sealing bar that is attached to its own sealing bar holder in a spring-loaded manner, the sealing bar will be moved along the trajectory A more in the direction of its own sealing bar holder. Thus, even if it is not possible to measure distances between both sealing bars, by measuring distances between a sealing bar and its own sealing bar holder it is possible to determine the measure of the displacement along the trajectory A and use this for the detection of defects during sealing.

The method comprises the additional steps of calculating a unitless measure of deviation at a point in time T and comparing the unitless measure of deviation to a predetermined threshold value. If the unitless measure of deviation is less than or equal to the predetermined threshold value, the seal obtained is regarded as a correct sealing of the package comprising film. The point in time Tis in a time interval in which the measured distances change or have changed due to the movement of one or both sealing bars towards each other. The point in time T is before a point in time when one or both sealing bars are removed from each other. This means that the unitless measure of deviation is calculated at an instant, the point in time T, when the package comprising film is or has already been sealed by the sealing bars. Only one unitless measure of deviation is calculated.

The unitless measure of deviation is calculated from a relative measure for a distance between both sealing bars or between a sealing bar and a sealing bar holder.

The relative measure for the distance between both sealing bars or between a sealing bar and its sealing bar holder is calculated from the previously described measure for the displacement along the trajectory A of points D of the two sealing bars relative to each other or of a point D of a sealing bar relative to its own sealing bar holder in relation to an expected value for the distance between the two sealing bars, respectively, in relation to an expected value for the distance between a sealing bar and its own sealing bar holder. Alternatively, the relative measure for the distance between both sealing bars or between a sealing bar and a sealing bar holder is calculated as a difference between an expected value for the distance between the two sealing bars, respectively, an expected value for the distance between a sealing bar and its own sealing bar holder, and said measure for the displacement along the trajectory A, in relation to a set variance for said difference. The expected value for the distance and/or the set variance are preferably determined on the basis of statistical data on distances measured using distance sensors.

A method according to the present embodiment is very advantageous because it is possible to detect defects during sealing of a package comprising film, both in the case that the distance between the two sealing bars can be measured, and in the case where a packaging machine has such a structure, it is not possible to measure the distance between the sealing bars directly or indirectly by means of the distance sensors. The detection of defects during sealing is based on relative displacements of the sealing bars relative to each other or, in case it is not possible to directly or indirectly measure the distance between the sealing bars, on relative displacements of a sealing bar relative to its own sealing bar holder. Because the method works with relative displacements, it is not necessary to know an absolute distance between the sealing bars.

According to a preferred embodiment, the unitless measure of deviation is the square root of a weighted square sum of at least two terms. A first term is a relative measure of a distance between both sealing bars or between a sealing bar and a sealing bar holder. The relative measure for the distance between both sealing bars or between a sealing bar and its sealing bar holder is as in the previously described embodiment. A second term is a relative measure of a rotation of a sealing bar about an axis E.

The unitless measure of deviation is therefore calculated according to the following formula:

$$\text{deviation} = \sqrt{\sum_{1}^{n} (w_i.\text{term}_i)^2}$$

Here n is equal to or greater than 2, $\text{term}_i$ is an i-th term, and $w_i$ is a weight for the i-th term.

Multiple distance sensors are advantageous for determining a measure of rotation of a sealing bar about axis E at a point in time, where the axis E intersects the sealing bar and where the axis E is transverse to the trajectory A and transverse to the longitudinal direction of the sealing bars. Transverse to trajectory A means transverse to the line describing trajectory A at a position on the trajectory at which said sealing bar is located at said point in time. The axis E preferably passes through the point D of the sealing bar. For example, the measure of rotation about axis E is determined by calculating a difference between distances measured by distance sensors, wherein the distance sensors are located on both sides of the point D in the longitudinal direction and/or are at a different distance from the point D in the longitudinal direction. This difference is proportional to the rotation. If the distance sensors are not equidistant from the point D according to the longitudinal direction, the measured distances are given a weight that depends on a distance from the distance sensor to the point D, seen in the longitudinal direction. This difference could be converted to a rotation angle. However, this is not necessary for the method, as will be apparent from the further description. Distance sensors located longitudinally on different sides of point D and equidistant from point D are advantageous because it is not necessary to know an exact longitudinal distance between the distance sensors and point D. Because the rotation angle is not used, it is also not necessary to know the exact distance in the longitudinal direction between the distance sensors and the point D.

The measure for the displacement along the trajectory A and the measure for the rotation around the axis E combined are particularly advantageous for detecting defects during sealing of a package comprising film.

The advantage of the measure of displacement along the trajectory A is as in the previously described embodiment.

In the case of inclusions that are located predominantly on one side of the sealing bar along the longitudinal direction, the sealing bars will, for example, each rotate about an axis E when moving towards each other along the trajectory A. This rotation is due to a spring-loaded attachment of the sealing bars to their own sealing bar holder and/or mechanical tolerances in attachments of the sealing bars to the sealing bar holders. When measuring distances between both sealing bars, the measure of rotation about an axis E is a measure of the combined rotations of both sealing bars. It is hereby irrelevant for the method which rotation each sealing bar undergoes individually. With a sealing bar that is attached to its own sealing bar holder in a spring-loaded manner, the sealing bar will be moved more towards its own sealing bar holder at one end than at the other end. Thus, even if it is not possible to measure distances between both sealing bars, by measuring distances between a sealing bar and its own sealing bar holder it is possible to determine the measure of rotation about axis E and use this for the detection of defects during sealing.

The second term is then calculated from the previously described measure of rotation of a sealing bar about axis E in relation to an expected value for the rotation of the sealing bar about axis E. As previously described, the rotation is not necessarily expressed as an angle. This is also not necessary for the expected value for the rotation. Alternatively, the second term is calculated as a difference between an expected value for the rotation of a sealing bar about axis E and said measure of rotation of a sealing bar about axis E, in relation to a set variance for said difference. The expected value for the rotation and/or the set variance are preferably determined on the basis of statistical data on distances measured using distance sensors.

The weights $w_i$ are preferably determined on the basis of statistical data on terms term; calculated on the basis of preliminary testing wherein the package comprising film is sealed with a packaging machine, which is the same as or similar to the packaging machine that will be used for sealing the package comprising film.

In the case of a weighted square sum with only the first term and the second term, the weighted square sum can be regarded as an equation of an ellipse. As previously described, the seal obtained is regarded as a correct sealing of the package comprising film if the unitless measure of deviation is less than or equal to the predetermined threshold value. This can be compared to checking whether the unitless measure of deviation falls within or on an ellipse, wherein a length of an axis of the ellipse is determined by a weight $w_i$ in the weighted square sum and by the predetermined threshold value.

The relative sizes are advantageous because they allow equal or nearly equal predetermined thresholds to be used for similar packaging machines. Exact distances are not necessary for this.

This embodiment is particularly advantageous because two relative displacements are taken into account, namely a displacement along the trajectory A and a rotation about the axis E. As a result, possible inaccuracies in the event that the distance between the sealing bars cannot be measured is largely to completely compensated. An additional advantage is that defects can also be detected, in which, for example, in the middle of a sealing bar, according to the longitudinal direction of the sealing bar, a similar displacement along the trajectory A is obtained as with a correct sealing of a package comprising film, while more towards an end of the sealing bar an inclusion is present, whereby in reality no quality seal has been obtained.

According to a preferred embodiment, the first term is the difference between an expected value for the distance between both sealing bars or between a sealing bar and a sealing bar holder and a calculated distance between both sealing bars, respectively, between the sealing bar and the sealing bar holder, and divided by a set variance for the stated difference between the expected value for the distance and the calculated distance. The calculated distance between both sealing bars or between a sealing bar and a sealing bar holder is then the measure for displacement along the trajectory A of points D of the two sealing bars relative to each other or of a central point D of a sealing bar relative to its own sealing bar holder. The set variance is preferably determined on the basis of preliminary testing wherein the package comprising film is sealed with a packaging machine, which is the same as or similar to the packaging machine that will be used for sealing the package comprising film. Preferably, after the tests have been completed for sealings that are judged to be of sufficient quality by an operator, a variance of said difference is calculated. The calculated variance is preferably based on a Gaussian distribution. The set variance is then preferably at most five times the calculated variance, more preferably at most four times the calculated variance, even more preferably at most three times the calculated variance, even more preferably equal to three times the calculated variance. The expected value for the distance is a weighted average of calculated distances between the two sealing bars, respectively between the sealing bar and the sealing bar holder, in case of correct sealings of the package comprising film. Preferably, more weight is given to more recently calculated distances. The expected value for the distance is preferably initially a weighted average of the calculated distances for sealings that are judged to be of sufficient quality by an operator after the tests have been completed or when a packaging machine is started up.

The first term ($term_1$) is thus calculated according to the following formula:

$$term_1 = \frac{(dist_{calc} - dist_{avg})}{range_{dist}}$$

Here $dist_{calc}$ is the calculated distance between both sealing bars or a sealing bar and its sealing bar holder, $dist_{avg}$ is the expected value for the distance between both sealing bars, respectively between the sealing bar and its sealing bar holder, and $range_{dist}$ is the set variance for said difference.

This embodiment is advantageous because a relative measure for the distance between the two sealing bars or between a sealing bar and its sealing bar holder can be calculated in a simple manner. Relative sizes are advantageous as previously described because they allow equal or nearly equal predetermined thresholds to be used for similar packaging machines. Exact distances are not necessary for this.

According to a preferred embodiment, the second term is the difference between an expected value for the rotation of a sealing bar about the axis E and a calculated rotation of the sealing bar about the axis E and divided by a set variance for said difference between the expected value for the rotation about axis E and the calculated rotation about axis E. As described before, it is not necessary to convert a rotation to an angle of rotation. The calculated rotation of the sealing bar about axis E is then the measure of rotation of a sealing bar about an axis E. The set variance is preferably determined on the basis of preliminary testing wherein the package comprising film is sealed with a packaging machine, which is the same as or similar to the packaging machine that will be used for sealing the package comprising film. Preferably, after the tests have been completed for sealings that are judged to be of sufficient quality by an operator, a variance of said difference is calculated. The calculated variance is preferably based on a Gaussian distribution. The set variance is then preferably at most five times the calculated variance, more preferably at most four times the calculated variance, even more preferably at most three times the calculated variance, even more preferably equal to three times the calculated variance. The expected value for the rotation about the axis E is a weighted average of calculated rotations about the axis E in case of correct sealings of the package comprising film. Preferably, more weight is given to more recently calculated distances. The expected value for the rotation about the axis E is preferably initially a weighted average of the calculated rotations about the axis E for sealings that are judged to be of sufficient quality by an operator after the tests have been completed or when a packaging machine is started up.

The second term ($term_2$) is thus calculated according to the following formula:

$$term_2 = \frac{(rotE_{calc} - rotE_{avg})}{range_{rotE}}$$

Here, $rotE_{calc}$ is the calculated rotation about axis E, $rotE_{avg}$ is the expected value for the rotation about axis E, and $range_{rotE}$ is the set variance for said difference.

This embodiment is advantageous because a relative measure for the rotation of a sealing bar about the axis E can be calculated in a simple manner. Relative sizes are advantageous as previously described because they allow equal or nearly equal predetermined thresholds to be used for similar packaging machines. Exact distances or angles of rotation are not necessary for this.

According to an embodiment, the weighted square sum contains two terms. The two terms are the previously described first term and second term. Because only the first term and the second term are used, only a limited number of weights need to be determined for the weighted square sum. If, as in previously described embodiments, a set variance is required when calculating the first term and the second term, only two set variances need be determined. As a result, in this embodiment there are only a limited number of variables that need to be determined before defects during sealing of a package comprising film can be detected. This embodiment is particularly advantageous in cases where distances between both sealing bars or between only one sealing bar and its sealing bar holder are measured.

According to a preferred embodiment, the weighted square sum comprises at least three terms. Two of the terms are the first term and second term described previously. A third term is a relative measure of a rotation of a sealing bar about the longitudinal axis of the sealing bar.

Rotation about the longitudinal axis of the sealing bar is an indication that there are for instance inclusions of a product to be packaged, for instance a food product, between the film and the other part of the package comprising film. If these inclusions, seen in a direction transverse to the longitudinal direction, are mainly located on one side of a sealing bar, then this can lead to a rotation about the longitudinal axis of the sealing bar, depending on mechanical tolerances. A measure of rotation of the sealing bar about the longitudinal axis of the sealing bar is thus advantageous for detecting defects during sealing of a package comprising film.

For example, rotation of the sealing bar around the longitudinal axis of the sealing bar can be detected using three distance sensors, where the three distance sensors and the point D of the sealing bar are not in one plane. The three distance sensors are necessary to simultaneously determine both the second term and the third term. For example, a measure of rotation about the longitudinal axis is determined by calculating a difference between distances measured by distance sensors, wherein at least two distance sensors are located in a direction transverse to the longitudinal direction of the sealing bar at a different distance from the point D of the sealing bar and/or a different side of the sealing bar. This difference is proportional to the rotation. If distance sensors according to said direction transverse to the longitudinal direction are not equidistant from point D, the measured distances are given a weight depending on a distance from the distance sensor to point D, seen according to said direction transverse to the longitudinal direction. This difference could be converted to a rotation angle. However, this is not necessary for the method. Distance sensors which are equidistant from point D according to said direction transverse to the longitudinal direction are advantageous because it is not necessary to know an exact distance according to said direction transverse to the longitudinal direction between the distance sensors and point D. Because the angle of rotation is not used, it is also not necessary to know the exact distance according to the said direction transverse to the longitudinal direction between the distance sensors and the point D. It will be apparent that if there is simultaneous rotation about the axis E and about the longitudinal axis, then both measures of rotations can be determined by solving a system of equations. The third term is calculated from the measure of rotation of a sealing bar about the longitudinal axis of the sealing bar in relation to an expected value for the rotation of the sealing bar about the longitudinal axis of the sealing bar. As previously described, the rotation is not necessarily expressed as an angle. This is also not necessary for the expected value for the rotation. Alternatively, the third term is calculated as a difference between an expected value for the rotation of a sealing bar about the longitudinal axis of the sealing bar and the stated measure of rotation of a sealing bar about the longitudinal axis of the sealing bar, in relation to a set variance for said difference. The expected value for the rotation and/or the set variance are preferably determined on the basis of statistical data on distances measured using distance sensors.

This embodiment is advantageous in order to obtain a higher sensitivity and accuracy when detecting defects during sealing of a package comprising film. This is particularly advantageous with packaging machines where there is a mechanical tolerance that limits the rotation of sealing bars about their longitudinal axis.

According to a further embodiment, the third term is the difference between an expected value for the rotation of a sealing bar about the longitudinal axis of the sealing bar and a calculated rotation of a sealing bar about the longitudinal axis of the sealing bar, divided by a set variance for said difference between the expected value for the rotation about the longitudinal axis of the sealing bar and the calculated rotation about the longitudinal axis of the sealing bar. As described before, it is not necessary to convert a rotation to an angle of rotation. The calculated rotation of the sealing bar about the longitudinal axis of the sealing bar is then the measure for rotation of the sealing bar about said longitudinal axis. The set variance is preferably determined on the basis of preliminary testing wherein the package comprising film is sealed with a packaging machine, which is the same as or similar to the packaging machine that will be used for sealing the package comprising film. Preferably, after the tests have been completed for sealings that are judged to be of sufficient quality by an operator, a variance of said difference is calculated. The calculated variance is preferably based on a Gaussian distribution. The set variance is then preferably at most five times the calculated variance, more preferably at most four times the calculated variance, even more preferably at most three times the calculated variance, even more preferably equal to three times the calculated variance. The expected value for the rotation about the longitudinal axis of the sealing bar is a weighted average of calculated rotations about the longitudinal axis of the sealing bar in case of correct sealings of the package comprising film. Preferably, more weight is given to more recently calculated distances. The expected value for the rotation about the longitudinal axis of the sealing bar is preferably initially a weighted average of the calculated rotations about the longitudinal axis of the sealing bar for sealings that are judged to be of sufficient quality by an operator after the tests have been completed or when a packaging machine is started up.

The third term ($term_3$) is thus calculated according to the following formula:

$$term_3 = \frac{(rotL_{calc} - rotL_{avg})}{range_{rotL}}$$

Here $rotL_{calc}$ is the calculated rotation about the longitudinal axis of the sealing bar, $rotL_{avg}$ is the expected value for the rotation about the longitudinal axis of the sealing bar, and $range_{rotL}$ is the set variance for said difference.

This embodiment is advantageous because a relative measure for the rotation of a sealing bar about the longitudinal axis of the sealing bar can be calculated in a simple manner. Relative sizes are advantageous as previously described because they allow equal or nearly equal predetermined thresholds to be used for similar packaging machines. Exact distances or angles of rotation are not necessary for this.

According to an embodiment, the weighted square sum contains three terms. The three terms are the previously described first term, second term, and third term. This embodiment is particularly advantageous in cases where distances between both sealing bars or between only one sealing bar and its sealing bar holder are measured, in order to obtain an optimum possible sensitivity and accuracy when detecting defects during sealing of a package comprising film, while a still a limited number of variables need to be determined.

According to an embodiment, the weighted square sum contains six terms. Three terms are the previously described first term, second term, and third term. These terms are calculated for a first of both sealing bars. A fourth, fifth and sixth term are calculated for a second of both sealing bars. The fourth term corresponds to the first term, but calculated for the second sealing bar. The fifth term corresponds to the second term, but calculated for the second sealing bar. The sixth term corresponds to the third term, but calculated for the second sealing bar. This embodiment is advantageous in cases wherein distances between a sealing bar and its sealing bar holder are measured for both sealing bar holders, in order to obtain a higher possible sensitivity and accuracy when detecting defects during sealing of a package comprising film in comparison with a previously described embodiment wherein the weighted square sum contains three terms.

According to an embodiment, the weighted square sum contains four terms. Two terms are the previously described first term and second term. These terms are calculated for a first of both sealing bars. A fourth and fifth are calculated for a second of both sealing bars. The fourth term corresponds to the first term, but calculated for the second sealing bar. The fifth term corresponds to the second term, but calculated for the second sealing bar. This embodiment is advantageous in cases wherein distances between a sealing bar and its sealing bar holder are measured for both sealing bar holders, in order to obtain a higher sensitivity and accuracy when detecting defects during sealing of a package comprising film in comparison with a previously described embodiment wherein the weighted square sum contains two terms.

According to a preferred embodiment, a variance of the calculated distances or rotations in case of correct sealings is calculated after calculating a term in case of correct sealing of the package comprising film. The calculated variance is preferably based on a Gaussian distribution. According to any of the previously described embodiments, the term is calculated in relation to the first term, the second term, the third term, the fourth term, the fifth term, or the sixth term, where a difference between an expected value for the distance or rotation and a calculated distance or rotation is divided by a set variance for the difference. A new expected value for the calculated distance, respectively rotation, is calculated if the calculated distance, respectively rotation, falls within the interval of a current expected value±the calculated variance.

This preferred embodiment has the advantage that as a result when calculating the terms of the unitless measure of deviation, a dynamic behavior during the sealing of the package comprising film is taken into account, for instance due to heating of the packaging machine, due to an increase or decrease in a thickness of the film, due to an increase or decrease of tension on or in the film, due to temperature variations of the packaging machine or the sealing bars, etc. As a result, defects can be detected with greater sensitivity, because less or no account has to be taken of the dynamic behavior at the predetermined threshold value. An additional advantage is that the calculation of the expected value does not take into account correct sealings of packages comprising film that fall outside or on the interval of the current expected value±the calculated variance. These correct sealings can be seen as deviating values (outliers) from the current expected value, which are not representative of the dynamic behavior.

According to a further embodiment, a transition model for a course of the expected value for a distance or a rotation is drawn up as a function of a number of sealings performed. The transition model is preferably drawn up on the basis of preliminary testing, wherein the package comprising film is sealed with a packaging machine, which is the same as or similar to the packaging machine that will be used for sealing the package comprising film. For example, the transition model is an asymptotic function that is fitted through expected values for a distance or a rotation as a function of the number of sealings carried out, where the expected value is a weighted average. Preferably, only correct sealings are used to calculate the weighted average. The new expected value for said distance or said rotation, respectively, is corrected using the transition model. This is done by adding an ideal expected value for said distance or said rotation, respectively, based on the transition model, and subtracting a weighted average of ideal expected values for said distance, respectively said rotation, based on the transition model.

This embodiment is particularly advantageous for compensating transient phenomena when starting up a packaging machine. At start-up, the packaging machine is colder than in the normal regime, which means that there may be more or less tolerances between mechanical parts of the packaging machine, for example, or that there may be more or less tension on a film. By taking these transient phenomena into account, it is also possible during start-up to detect defects during sealing of a package comprising film with great accuracy, because no large predetermined threshold value for the unitless measure of deviation has to be taken, so that the unitless measure of deviation in case of a correct sealing is also below the threshold during start-up.

According to an embodiment, measured distances are filtered with the aid of a low-pass filter. The low-pass filter preferably has a cut-off frequency of at most 4.5 kHz, more preferably at most 4.0 kHz, even more preferably at most 3.5 kHz and even more preferably at most 3.0 kHz. The low-pass filter is a Butterworth filter, a Chebyshev filter, a Bessel filter, or an elliptical filter. Preferably, the low-pass filter is a Chebyshev filter. Preferably, distances measured with the aid of the distance sensors are oversampled. The sampling frequency is preferably at least 9 kHz, more preferably at least 10 kHz, even more preferably at least 11 kHz, and even more preferably at least 12 kHz. This embodiment is advantageous for removing high-frequency measurement noise from the measured distances.

According to an embodiment, measured values of distance sensors are linearized. The measured values of the distance sensors are linearized using a high-order polynomial. The polynomial is a polynomial of at least order 3, preferably at least order 4 and more preferably at least order 5. This embodiment is advantageous because certain types of distance sensors have a non-linear response as a function of the distance to be measured. By linearizing the measured values and thus the response around an operating point, measurements from the distance sensors around the operating point can be processed using linear techniques, simplifying processing of the measured distances.

According to a preferred embodiment, after measuring distances between both sealing bars or distances between a sealing bar and a sealing bar holder, a constant value is added. The constant value is proportional to a difference between the measured distances at a point in time $T_1$, wherein the point in time $T_1$ is in a time interval in which the measured distances change by moving one or both sealing bars towards each other. $T_1$ is not necessarily a fixed point in time after one or both sealing bars start to move towards each other. This depends on the accuracy of a clock used to sample readings from distance sensors. An inaccuracy of the clock or a low clock frequency can cause that, compared to the start of moving one or both sealing bars towards each other, the changing of measured distances can vary by, for example, a few ms. The point in time $T_1$ is determined, for example, as a fixed point in time after a first change in measured distance or as the middle of the time interval in which the measured distances change due to one or both sealing bars moving towards each other. The constant value can be a single value that is added to distances measured by a single distance sensor. The constant value can be multiple values, where each value is specific to a distance sensor. The constant value can be negative.

This embodiment is advantageous because it is hereby not necessary to position all said distance sensors with submillimeter accuracy at the same height along an axis perpendicular to the sealing surface. If there are small deviations in height along said axis, the distance sensors will measure a different distance. With certain types of distance sensors, for example inductive or capacitive distance sensors, the distance sensors will start measuring distances at a different time. By adding the constant value to the measured distances, flanks of the measured distances as a function of time, can be positioned on top of each other at the point in time $T_1$, compensating for the difference in height according to the said axis, but leaving differences in distances at the height of the distance sensors between the two sealing bars or between a sealing bar and its sealing bar holder.

According to an embodiment, the point in time T is determined as a fixed point in time after a reference point $T_0$ in case distances between both sealing bars are measured. $T_0$ is a point that marks a transition between changing distances and stable distances between both sealing bars. For example, $T_0$ is an intersection of a straight line fitted through changing measured distances with a horizontal straight line fitted through constant measured values. For example, the fixed point in time is a few ms after $T_0$. This embodiment is advantageous for determining a suitable point in time for calculating a unitless measure of deviation if an inaccurate clock or a clock with too large a period is used to sample readings from the distance sensors.

According to an embodiment, the point in time T is determined as a point within the time interval in which the measured distances change due to the movement of one or both sealing bars towards each other in case distances between a sealing bar and its sealing bar holder are measured. The point in time T is, for example, a point in time at which a first measured distance changes or a fixed point in time after the point in time at which a first measured distance changes. Alternatively, the point in time T is the middle of the time interval in which the measured distances change due to one or both sealing bars moving towards each other. This embodiment is advantageous for determining a suitable point in time for calculating a unitless measure of deviation if an inaccurate clock or a clock with too large a period is used to sample readings from the distance sensors.

According to a preferred embodiment, the film is not cut if the unitless measure of deviation exceeds the predetermined threshold value. This embodiment is particularly advantageous if the package comprising film is a tubular film. If the predetermined threshold value is exceeded, it is clear that there is a defect in the seal. As a result, when the film is cut, it is possible that product falls out of the formed pouch and contaminates the packaging machine or a blade for cutting the film. Contamination may have a negative influence on the cutting of the film. A dirty blade can get stuck in the sealing bars. In that case, the blade must be removed, cleaned and reinstalled, which means that production time is lost. By not cutting the film, two successive pouches remain together and prevent product from falling out of one of the pouches. The product can only migrate from one pouch to another.

According to an embodiment, a signal is generated if the unitless measure of deviation exceeds the predetermined threshold value. This signal is advantageous for use by other systems or by a packaging machine for automatic ejection, removal or marking of packages comprising film where there is a defect in the sealing.

In a second aspect, the invention relates to a device for detecting defects during sealing of a package comprising film.

According to a preferred embodiment, the device comprises two sealing bars, a plurality of distance sensors for measuring distances between both sealing bars or distances between a sealing bar and a sealing bar holder, and a processing unit for processing distances measured with the aid of the plurality of distance sensors.

The two sealing bars extend in a longitudinal direction. The sealing bars therefore have a longitudinal direction, a height direction and a transverse direction. The longitudinal direction determines the largest dimension of a sealing bar. The two sealing bars are parallel along the longitudinal direction. Each sealing bar is mounted in its own sealing bar holder. The sealing bars are preferably releasably mounted in the sealing bar holders. This is advantageous for cleaning and replacing the sealing bars. One or both sealing bars are movable along a trajectory A. The said longitudinal direction of the sealing bars is transverse to a line described by the trajectory A during the movement of one sealing bar or both sealing bars along the trajectory A. The trajectory A is described by a straight line, an arc or another suitable curve. Preferably, the trajectory A is a straight line. A sealing bar can by moving its own sealing bar holder. A sealing bar comprises a longitudinal axis. The longitudinal axis is parallel to the longitudinal direction.

One skilled in the art will appreciate that a device can comprise several pairs of sealing bars, for example two pairs, three pairs or even more pairs.

The processing unit comprises means for performing a method according to the first aspect. This embodiment is advantageous because the device comprises the necessary distance sensors for carrying out the method and because this results in an integrated device for detecting defects during sealing of packages comprising film.

According to a preferred embodiment, at least two of the plurality of distance sensors are located in a plane B. The trajectory A is a straight line, where the straight line of the trajectory A is transverse to the said longitudinal direction. The plane B is parallel to the said longitudinal direction of both sealing bars. The plane B is parallel to the straight line of the trajectory A. The at least two of the several distance sensors lie symmetrically in plane B with respect to an axis C. The axis C is parallel to the straight line of the trajectory A. The axis C passes through a point D. The point D is in the center of a sealing surface of a sealing bar. The sealing surfaces of both sealing bars are surfaces which, during sealing of the package comprising film, are wholly or partly in contact with the film or the other part of the package comprising film and between which the film and the other part of the package comprising film are clamped.

This device has the advantage, among other things, that due to the symmetrical positioning of the at least two distance sensors with respect to an axis C in the plane B, it is possible to determine two relative displacements of the sealing bars with respect to each other, or in case it is not possible to directly or indirectly measure the distance between the sealing bars, two relative displacements of a sealing bar relative to a sealing bar holder. The two relative displacements are a linear displacement along the trajectory A and a rotation about an axis E, where axis E intersects the sealing bar and axis C and is transverse to axis C and transverse to the longitudinal direction of the sealing bars. The relative displacements are suitable for detecting defects during sealing of the package comprising film, even if it is not possible to determine an absolute distance between the sealing bars.

According to a further embodiment, two distance sensors are attached to a first sealing bar holder and two targets for said two said distance sensors are attached to a second sealing bar holder. The two distance sensors are symmetrical in plane B with respect to axis C. The two sealing bars are preferably not attached to the sealing bar holders in a spring-loaded manner. This embodiment is advantageous for measuring distances between both sealing bars. A measured distance corresponds to a distance between a distance sensor and a corresponding target. This embodiment is also advantageous for determining rotation of a sealing bar about axis E.

According to an alternative embodiment, two distance sensors are attached to a first sealing bar holder and two targets for said two said distance sensors are attached to a first sealing bar. The first sealing bar is attached in a spring-loaded manner to the first sealing bar holder in a direction parallel to the straight line of the trajectory A. The two distance sensors are symmetrical in plane B with respect to axis C. This embodiment is advantageous for measuring distances between a sealing bar and its sealing bar holder. A measured distance corresponds to a distance between a distance sensor and a corresponding target. This embodiment is also advantageous for determining rotation of a sealing bar about axis E.

According to a further embodiment, two distance sensors are attached to a second sealing bar holder and two targets for said two said distance sensors are attached to a second sealing bar. The second sealing bar is attached in a spring-loaded manner to the second sealing bar holder in a direction parallel to the straight line of the trajectory A. The two distance sensors are symmetrical in plane B with respect to axis C. This embodiment is advantageous for measuring distances between the first sealing bar and its sealing bar holder and between the second sealing bar and its sealing bar holder. A measured distance corresponds to a distance between a distance sensor and a corresponding target. This embodiment is also advantageous for determining rotation of the first sealing bar about its axis E and the second sealing bar about its axis E.

One skilled in the art will appreciate that a method according to the first aspect is preferably performed with a device according to the second aspect and that a device according to the second aspect is preferably configured for performing a method according to the first aspect. Each feature described in this document, both above and below, can therefore relate to any of the three aspects of the present invention.

In a third aspect, the invention relates to a use of a method according to the first aspect and/or a device according to the second aspect for sealing food packages.

This use results in an improved packaging of food products, because possible defects during the sealing of the food packaging are automatically detected, even when using a packaging machine with a construction that does not allow to measure distances between sealing bars of the packaging machine. This prevents food products from entering the food chain that, for example, are not packaged airtight and can therefore spoil quickly, with a possible risk of food poisoning, for example.

In what follows, the invention is described by way of non-limiting figures illustrating the invention, and which are not intended to and should not be interpreted as limiting the scope of the invention.

DESCRIPTION OF THE FIGURES

FIG. 1 shows a schematic representation of an arrangement of distance sensors on sealing bar holders of a device according to an embodiment of the present invention.

The figure shows a cross-section of the device in a plane B (B). The device comprises two sealing bars (1), each of which is attached to its own sealing bar holder (2). The two sealing bars (1) are preferably detachably attached to their own sealing bar holder (2). The two sealing bars (1) have a fixed position relative to their own sealing bar holder (2). The two sealing bars (1) are parallel. The two sealing bars (1) extend in a longitudinal direction (6). One or both sealing bars (1) are movable along a trajectory A (A) due to the movement of their own sealing bar holder (2). The trajectory A (A) is described by a straight line. A distance sensor (3) is attached to a first sealing bar holder (2) at both ends. A second sealing bar holder (2) has a target (4) attached at both ends. The distance sensors (3) lie in plane B (B). The plane B (B) passes through both sealing bars (1) and is parallel to the longitudinal direction (6) and the straight line of the trajectory A (A). The two distance sensors (3) lie symmetrically in plane B (B) with respect to an axis C (C). The axis C (C) is parallel to the straight line of the trajectory A (A). The axis C (C) passes through a point D (D) in the center of a sealing surface of the sealing bar (1) attached to the first sealing bar holder (2). It will be apparent that the axis C (C) would be identical if the point D (D) were in the middle of a sealing surface of the sealing bar (1) attached to the second sealing bar holder (2). The distance sensors (3) are suitable for measuring distances between both sealing bars (1) by measuring a distance between a distance sensor (3) and a target (4) lying opposite in a direction parallel to the straight line of the trajectory A (A). The measured distances are suitable for calculating a first term and a second term of a weighted square sum, where the first term is a relative measure of a distance between the two sealing bars (1) according to the said direction parallel to the straight line of the trajectory A (A) and wherein the second term is a relative measure of a rotation of a sealing bar (1) about an axis E (E). The axis E (E) intersects the sealing bar (1) and the axis C (C) and is transverse to the axis C (C) and transverse to the longitudinal direction (6). The axis E (E) in this embodiment is through the point D (D). The point D (D) and the axis E (E) are indicated with a circle in FIG. 1.

Figure 2:
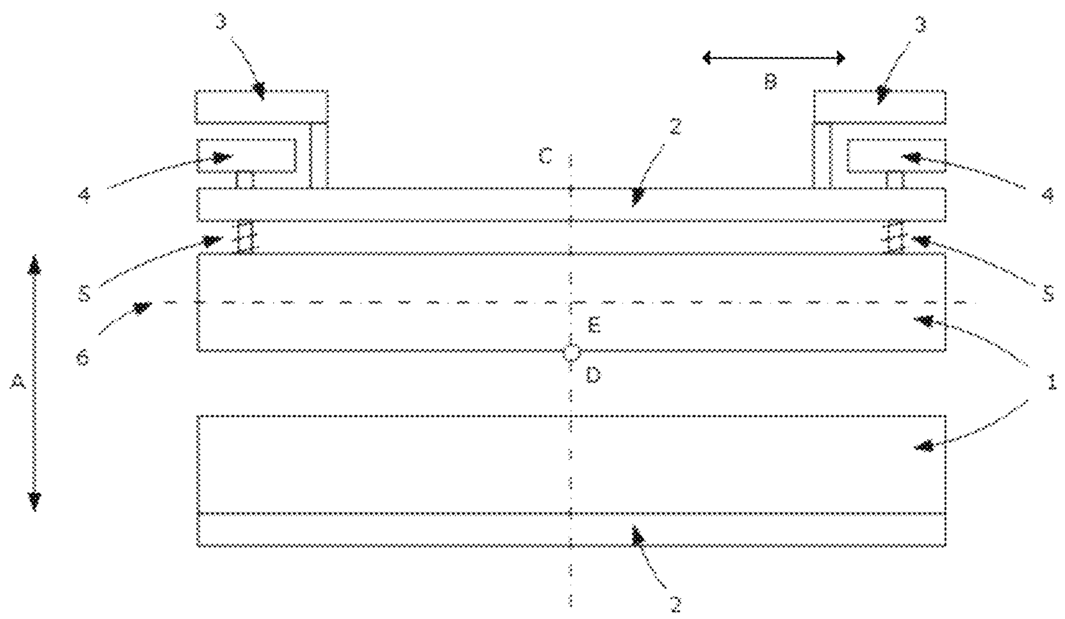
FIG. 2 shows a schematic representation of an arrangement of distance sensors on sealing bar holders of a device according to an alternative embodiment of the present invention.

FIG. 2 shows a schematic representation of an arrangement of distance sensors on sealing bar holders of a device according to an alternative embodiment of the present invention.

The figure shows a cross-section of the device in a plane B (B). The device comprises two sealing bars (1), each of which is attached to its own sealing bar holder (2). The two sealing bars (1) are preferably detachably attached to their own sealing bar holder (2). The two sealing bars (1) are attached to their own sealing bar holder (2) with a spring-loaded attachment (5). Due to the spring-loaded attachment (5), a sealing bar (1) can be moved relative to its own sealing bar holder (2). The two sealing bars (1) are parallel. The two sealing bars (1) extend in a longitudinal direction (6). One or both sealing bars (1) are movable along a trajectory A (A) due to the movement of their own sealing bar holder (2). The trajectory A (A) is described by a straight line. Two distance sensors (3) are attached to a first sealing bar holder (2). Two targets (4) are attached to a sealing bar (1), which is attached to the first sealing bar holder (2). The targets (4) are mounted on a part of the spring-loaded attachment (5) which has a fixed position relative to the sealing bar (1). The distance sensors (3) lie in plane B (B). The plane B (B) passes through both sealing bars (1) and is parallel to the longitudinal direction (6) and the straight line of the trajectory A (A). The two distance sensors (3) lie symmetrically in plane B (B) with respect to an axis C (C). The axis C (C) is parallel to the straight line of the trajectory A (A). The axis C (C) passes through a point D (D) in the center of a sealing surface of the sealing bar (1) attached to the first sealing bar holder (2). It will be apparent that the axis C (C) would be identical if the point D (D) were in the middle of a sealing surface of the sealing bar (1) attached to the second sealing bar holder (2). The distance sensors (3) are suitable for measuring distances between the first sealing bar holder (2) and the sealing bar (1) attached to the first sealing bar holder, by measuring a distance between a distance sensor (3) and a target (4) lying opposite in a direction parallel to the straight line of the trajectory A (A). The measured distances are suitable for calculating a first term and a second term of a weighted square sum, the first term being a relative measure of a distance along said direction parallel to the straight line of the trajectory A (A) between the first sealing bar holder (2) and the sealing bar (1) attached to the first sealing bar holder (2), and wherein the second term is a relative measure of a rotation about an axis E (E) of the sealing bar (1) attached to the first sealing bar holder (2). The axis E (E) Intersects the sealing bar (1) and the axis C (C) and is transverse to the axis C (C) and transverse to the longitudinal direction (6). The axis E (E) in this embodiment is through the point D (D). The point D (D) and the axis E (E) are indicated with a circle in FIG. 2.

Figure 3:
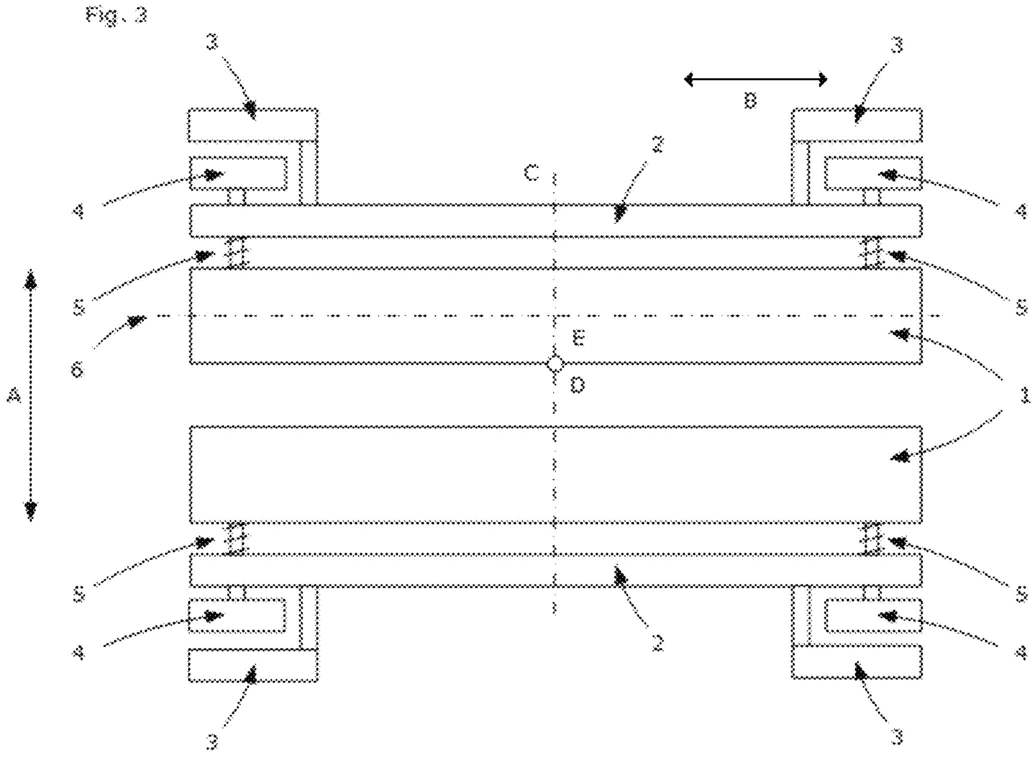
FIG. 3 shows a schematic representation of an arrangement of distance sensors on sealing bar holders of a device according to yet another alternative embodiment of the present invention.

FIG. 3 shows a schematic representation of an arrangement of distance sensors on sealing bar holders of a device according to yet another alternative embodiment of the present invention.

The device is very similar to the device in FIG. 2. In this embodiment, distance sensors (3) are attached to both sealing bar holders (2) and targets (4) are attached to both sealing bars (1). This makes it possible to calculate both a first term and a second term for a first sealing bar (1), as well as a fourth term and a fifth term for a second sealing bar (1), where the fourth term corresponds to the first term, but calculated for the second sealing bar (1) and where the fifth term corresponds to the second term, but calculated for the second sealing bar (1). It will be apparent that for both sealing bars (1) a point D (D) and an axis E (E) can be determined.

Figure 4:
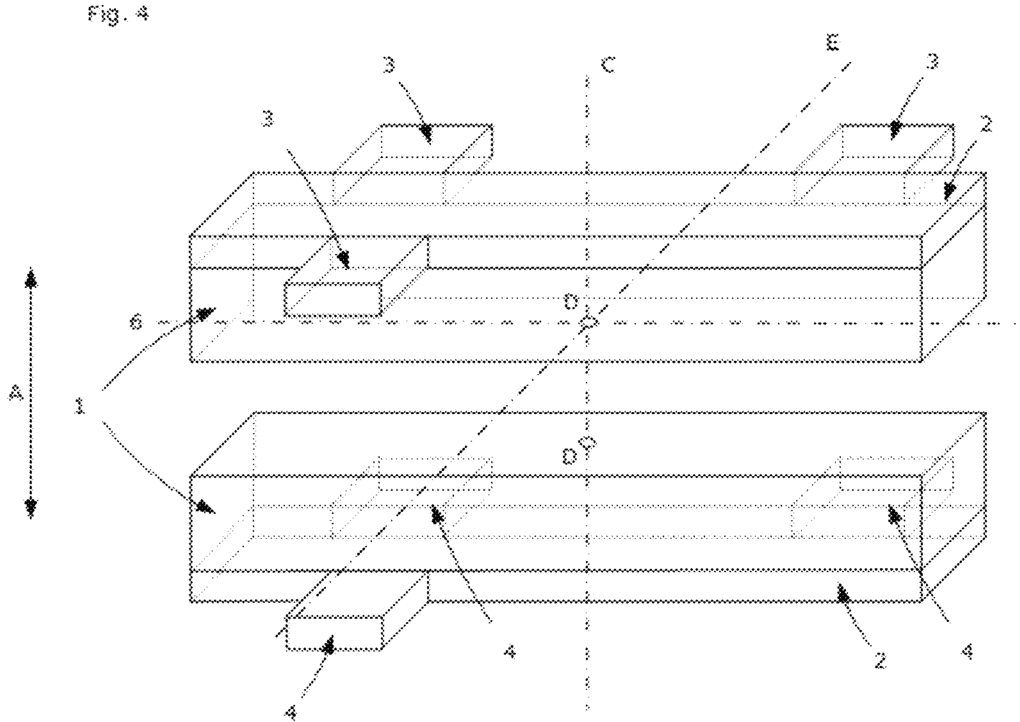
FIG. 4 shows a three-dimensional representation of an arrangement of distance sensors on the sealing bar holders of a device according to another alternative embodiment of the present invention.

FIG. 4 shows a three-dimensional representation of an arrangement of distance sensors on the sealing bar holders of a device according to another alternative embodiment of the present invention.

The device is very similar to the device of FIG. 1. The major difference is that the distance sensors (3) and the targets (4) are not attached to ends of the sealing bar holders (2), nor are they all symmetrical to the axis C (C). Important in this alternative embodiment is that the distance sensors (3) and the targets (4) are not in the same plane as the point D (D). This allows simultaneous calculation of the second term and the third term.

Figure 5:
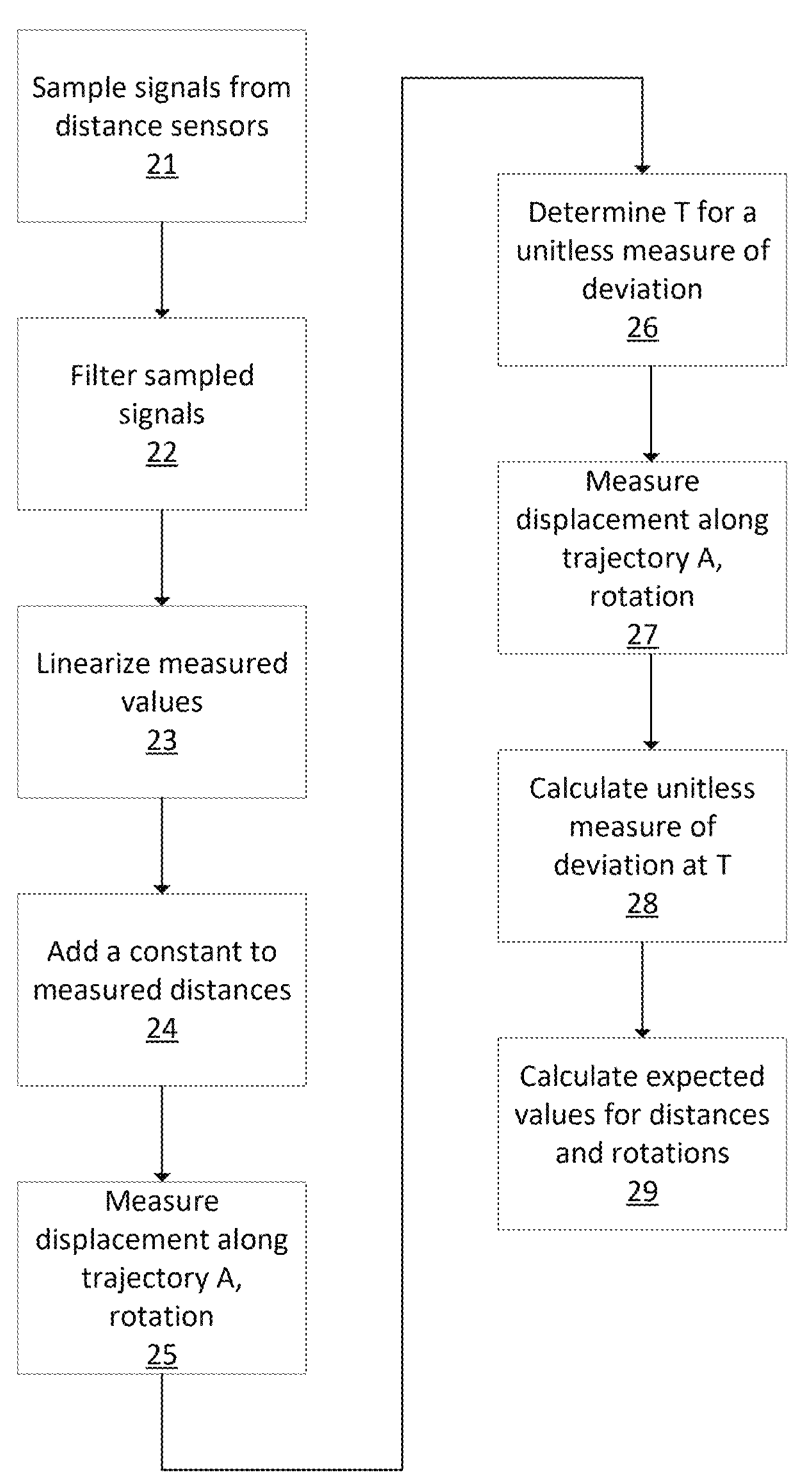
FIG. 5 shows a diagram of a method according to an embodiment of the present invention.

FIG. 5 shows a diagram of a method according to an embodiment of the present invention.

In a first step (21) signals from the distance sensors are sampled. The signals from the distance sensors are sampled at least during the movement of one or both sealing bars towards each other. A sampled signal is proportional to a distance between both sealing bars or between a sealing bar and its own sealing bar holder.

In a second step (22) the sampled signals are filtered with the aid of a low-pass filter, for example a Chebyshev filter. This removes high-frequency measurement noise from the sampled signals.

In a third step (23), measured values of the distance sensors are linearized. The measured values are the sampled signals. By linearizing the measured values, the measured values of the distance sensors can be processed in subsequent steps using linear techniques.

In a fourth step (24) a constant value is added to the measured distances. The constant value can be negative. The constant value is proportional to a difference between the measured distances at a point in time $T_1$, where the point in time $T_1$ is in a time interval in which the measured distances change by moving one or both sealing bars towards each other. If there are small deviations in height between the distance sensors according to axis perpendicular to a sealing surface of the sealing bar, then the distance sensors will measure a different distance. By adding the constant value to the measured distances, flanks of the measured distances as a function of time, can be positioned on top of each other at the point in time $T_1$, compensating for the difference in height according to the said axis, but leaving differences in distances at the height of the distance sensors between the two sealing bars or between a sealing bar and its sealing bar holder.

In a fifth step (25), a measure of a displacement along the trajectory A of points D of the two sealing bars relative to each other or of a point D of a sealing bar relative to its own sealing bar holder, and a measure of rotation of a sealing bar about an axis E are determined. The measure is determined for all points in time at which the signals from the distance sensors are sampled.

In a sixth step (26), a point in time T is determined for which a unitless measure of deviation is calculated. The point in time T is determined as a fixed point in time after a reference point $T_0$ in case distances between both sealing bars are measured. $T_0$ is a point that marks a transition between changing distances and stable distances between both sealing bars. The point in time T is determined as a point within the time interval in which the measured distances change due to the movement of one or both sealing bars towards each other in case distances between a sealing bar and its sealing bar holder are measured. The point in time T is, for example, a point in time at which a first measured distance changes or a fixed point in time after the point in time at which a first measured distance changes. Alternatively, the point in time T is the middle of the time interval in which the measured distances change due to one or both sealing bars moving towards each other.

In a seventh step (27), a measure of a displacement along the trajectory A of points D of the two sealing bars relative to each other or of a point D of a sealing bar relative to its own sealing bar holder, and a measure of rotation of a sealing bar about an axis E are determined. Optionally, a measure of rotation of a sealing bar about the longitudinal axis of the sealing bar is also determined. It will be apparent that in case sealing bars are attached to a sealing bar holder in a spring-loaded manner and distances between a sealing bar and its own sealing bar holder can be measured for both sealing bars, for both sealing bars a measure for displacement along the trajectory A, a measure for rotation about an axis E and optionally a measure for rotation about the longitudinal axis of the sealing bar can be determined.

In an eighth step (28) a unitless measure of deviation at the point in time T is calculated. The unitless measure of deviation is the square root of a weighted square sum of at least two terms. A first term is a relative measure of a distance between two sealing bars or between a sealing bar and a sealing bar holder. A second term is a relative measure of rotation about an axis E of a sealing bar. Optionally, the weighted square sum comprises a third term, where the third term is a relative measure of a rotation of a sealing bar about the longitudinal axis of the sealing bar. It will be apparent that in case sealing bars are attached to a sealing bar holder in a spring-loaded manner and distances between a sealing bar and its own sealing bar holder can be measured for both sealing bars, the weighted square sum can comprise four terms and optionally six terms. Three terms are the first term calculated for a first sealing bar, the second term for the first sealing bar, and optionally the third term for the first sealing bar. A fourth term corresponds to the first term, but calculated for a second sealing bar. A fifth term corresponds to the second term, but calculated for the second sealing bar. An optional sixth term corresponds to the optional third term, but calculated for the second sealing bar. When calculating the different terms, the expected values for the distances and rotations respectively from step seven (27) are used. After calculating the unitless measure of deviation, the unitless measure of deviation is compared to a predetermined threshold value. If the unitless measure of deviation is less than or equal to the predetermined threshold value, a seal obtained is regarded as a correct sealing of a package comprising film.

In a ninth step (29) new expected values for the distances and rotations respectively from step seven (27) are calculated. For this purpose, in case of correct sealing of the package comprising film, a variance of calculated distances or rotations is calculated in case of corrected sealings. A new expected value for the calculated distances, respectively rotations, is calculated if the calculated distance, respectively rotation, falls within the interval of a current expected value±the calculated variance.

After this, the method for a new detection of defects during sealing of a package comprising film starts again at the first step (21).

The numbered elements in the figures are:

1. Sealing bar
2. Sealing bar holder
3. Distance sensor
4. Target
5. Spring-loaded attachment
6. Longitudinal direction sealing bar
21. First step
22. Second step
23. Third step
24. Fourth step
25. Fifth step
26. Sixth step
27. Seventh step
28. Eighth step
29. Ninth step
A. Trajectory A
B. Plane B
C. Axis C
D. Central point D
E. Axis E

The invention claimed is:

1. A method for detecting defects during sealing of a package comprising film, comprising:

positioning the film and another part of the package comprising film between two parallel sealing bars, wherein the sealing bars extend in a longitudinal direction;

moving one or both of the sealing bars towards each other along a trajectory A, wherein a connection is formed between the film and the part of the package comprising film;

moving one or both of the sealing bars along the trajectory A, wherein the sealing bars are removed from each other;

and removing the sealed package;

characterized in that at least during the moving of one or both of the sealing bars towards each other, distances between both of the sealing bars or distances between one of the sealing bars and a sealing bar holder are measured by means of several distance sensors, and in that the method comprises calculating a unitless measure of deviation at a point in time T and comparing the unitless measure of deviation to a predetermined threshold value, wherein the point in time T is in a time interval in which the measured distances change or have changed by moving the one or both of the sealing bars towards each other and before the one or both of the sealing bars are removed from each other, wherein the unitless measure of deviation is calculated from a relative measure for a distance between both of the sealing bars or between one of the sealing bars and the sealing bar holder; and characterized in that the unitless measure of deviation is the square root of a weighted square sum of at least a first term and a second term, where the first term is a relative measure for a distance between both of the sealing bars or between one of the sealing bars and the sealing bar holder and where the second term is a relative measure of a rotation of one of the sealing bars about an axis E, and where the axis E intersects the sealing bar and is transverse to the trajectory A and transverse to the longitudinal direction of the sealing bars.

2. The method according to claim 1, characterized in that the weighted square sum comprises a third term that is a relative measure of a rotation of one of the sealing bars about the longitudinal axis of the sealing bar.

3. The method according to claim 2, characterized in that the third term is a difference between an expected value for the rotation of the sealing bar about the longitudinal axis of the sealing bar and a calculated rotation of the sealing bar about the longitudinal axis of the sealing bar, divided by a set variance for said difference between the expected value for the rotation about the longitudinal axis of the sealing bar and the calculated rotation about the longitudinal axis of the sealing bar, wherein the expected value for the rotation about the longitudinal axis of the sealing bar is a weighted average of calculated rotations about the longitudinal axis of the sealing bar in case of correct sealings of the package comprising film.

4. The method according to claim 3, characterized in that after calculating a term in case of correct sealing of the package comprising film, a variance of the calculated distances or rotations in case of correct sealings is calculated, wherein a new expected value for a distance or a rotation is calculated if the calculated distance, respectively rotation, falls within the interval of a current expected value±the calculated variance.

5. The method according to claim 4, characterized in that a transition model is drawn up for a course of the expected value for a distance or a rotation as a function of a number of seals performed, wherein the new expected value for said distance and said rotation respectively is corrected with the aid of the transition model, by adding an ideal expected value for said distance or said rotation, respectively, based on the transition model, and subtracting a weighted average of ideal expected values for said distance, respectively said rotation, based on the transition model.

6. The method according to claim 1, characterized in that the first term is the difference between an expected value for the distance between both of the sealing bars or between one of the sealing bars and the sealing bar holder and a calculated distance between both of the sealing bars, respectively, between the sealing bar and the sealing bar holder, and divided by a set variance for the stated difference between the expected value for the distance and the calculated distance, wherein the expected value for the distance is a weighted average of calculated distances between both of the sealing bars, respectively between the sealing bar and the sealing bar holder, in case of correct sealings of the package comprising film.

7. The method according to claim 1, characterized in that the second term is the difference between an expected value for the rotation of one of the sealing bars about the axis E and a calculated rotation of the sealing bar about the axis E and divided by a set variance for said difference between the expected value for the rotation about axis E and the calculated rotation about axis E, wherein the expected value for the rotation about the axis E is a weighted average of calculated rotations about the axis E in case of correct sealings of the package comprising film.

8. The method according to claim 1, characterized in that the film is retained in one piece if the unitless measure of deviation exceeds the predetermined threshold value.

9. The method according to claim 1, characterized in that a constant value is added to the measured distances after measuring distances between both of the sealing bars or distances between one of the sealing bars and the sealing bar holder, wherein the constant value is proportional to a difference between the measured distances at a point in time $T_1$, where the point in time $T_1$ is in a time interval in which the measured distances change by moving one or both sealing bars towards each other.

10. The method according to claim 1, further comprising generating a signal if the unitless measure of deviation exceeds the predetermined threshold value.

11. The method according to claim 1, wherein the package is a food package.

12. A device for detecting defects during sealing of a package comprising film, comprising two parallel sealing bars, wherein the sealing bars extend in a longitudinal direction and wherein one or both sealing bars are movable along a trajectory A, a plurality of distance sensors for measuring distances between both sealing bars or distances between a sealing bar and a sealing bar holder and a processing unit for processing distances measured with the aid of the plurality of distance sensors, wherein the device is configured to perform the method according to claim 1.

13. The device according to claim 12, characterized in that at least two of the several distance sensors are located in a plane B, wherein the trajectory A is a straight line, wherein the straight line of the trajectory A is transverse to the said longitudinal direction, where the plane B is parallel to the said longitudinal direction and to the straight line of the trajectory A, the at least two of the plurality of distance sensors lying symmetrically in plane B with respect to an axis C, wherein the axis C is parallel to the straight line of the trajectory A and wherein the axis C passes through a point D, wherein the point D is in the center of a sealing surface of a sealing bar.

14. The device according to claim 13, characterized in that two of the distance sensors are attached to a first sealing bar holder and two targets for the two distance sensors are attached to a second sealing bar holder, the two distance sensors being symmetrical in the plane B with respect to the axis C.

15. The device according to claim 13, characterized in that two of the distance sensors are attached to a first sealing bar holder and two targets for the two distance sensors are attached to a first sealing bar, wherein the first sealing bar is attached in a spring-loaded manner to the first sealing bar holder in a direction parallel to the trajectory A and the two distance sensors being symmetrical in the plane B with respect to the axis C.

16. The device according to claim 15, characterized in that two of the distance sensors are attached to a second sealing bar holder and two targets for the two distance sensors are attached to a second sealing bar, wherein the second sealing bar is attached in a spring-loaded manner to the second sealing bar holder in a direction parallel to the trajectory A and the two distance sensors being symmetrical in the plane B with respect to the axis C.

* * * * *